United States Patent
Zhang

(10) Patent No.: US 10,704,914 B2
(45) Date of Patent: Jul. 7, 2020

(54) POSITIONING METHOD USING BROADCAST SPEECHES

(71) Applicant: Guobiao Zhang, Corvallis, OR (US)

(72) Inventor: Guobiao Zhang, Corvallis, OR (US)

(73) Assignees: HangZhou HaiCun Information Technology Co., Ltd., HangZhou, ZheJiang (CN); Fuobiao Zhang, Corvallis, OR (US)

( * ) Notice: Subject to any disclaimer, the term of this patent is extended or adjusted under 35 U.S.C. 154(b) by 50 days.

(21) Appl. No.: 16/056,857

(22) Filed: Aug. 7, 2018

(65) Prior Publication Data

US 2018/0364050 A1 Dec. 20, 2018

Related U.S. Application Data

(63) Continuation of application No. 15/382,735, filed on Dec. 18, 2016, now Pat. No. 10,082,399, which is a continuation of application No. 14/637,380, filed on Mar. 3, 2015, now abandoned, which is a continuation of application No. 14/088,437, filed on Nov. 24, 2013, now abandoned.

(60) Provisional application No. 61/835,527, filed on Jun. 14, 2013.

(30) Foreign Application Priority Data

| Jul. 25, 2018 | (CN) | ............................ 2018 1 0822393 |
| Jul. 25, 2018 | (CN) | ............................ 2018 1 0825578 |
| Jul. 25, 2018 | (CN) | ............................ 2018 1 0825593 |

(51) Int. Cl.
| *G01C 21/20* | (2006.01) |
| *G01S 5/18* | (2006.01) |
| *G01C 22/00* | (2006.01) |
| *G01S 5/30* | (2006.01) |
| *G01C 21/14* | (2006.01) |
| *G01C 21/16* | (2006.01) |
| *G01S 5/26* | (2006.01) |

(52) U.S. Cl.
CPC .......... *G01C 21/206* (2013.01); *G01C 21/14* (2013.01); *G01C 21/165* (2013.01); *G01C 22/006* (2013.01); *G01S 5/18* (2013.01); *G01S 5/26* (2013.01); *G01S 5/30* (2013.01)

(58) Field of Classification Search
USPC ....................................................... 701/494
See application file for complete search history.

(56) References Cited

U.S. PATENT DOCUMENTS

| 3,982,186 A | 9/1976 | Furuno |
| 5,890,068 A | 3/1999 | Fettouche et al. |
| 6,219,385 B1 | 4/2001 | Weinberg |
| 7,224,809 B2 | 5/2007 | Hoetzel |
| 7,929,017 B2 | 4/2011 | Aggarwal et al. |
| 7,941,159 B2 | 5/2011 | Walley et al. |

(Continued)

OTHER PUBLICATIONS

Litwhiler & Lovell, A simple method for evaluating audible signals for acoustic measurements, the Technology Interface, Spring 2007.

*Primary Examiner* — Tyler D Paige

(57) ABSTRACT

A positioning method using music pieces continuously provides positioning service. At each signature burst (i.e., a highly unique short musical segment suitable for positioning), sounds of a music piece are used for positioning. Between signature bursts, dead reckoning (DR) is used.

10 Claims, 4 Drawing Sheets

(56) References Cited

U.S. PATENT DOCUMENTS

| | | | |
|---|---|---|---|
| 8,089,827 B2 | 1/2012 | Carotenuto | |
| 8,406,280 B2 | 3/2013 | Dragonov et al. | |
| 10,082,399 B2* | 9/2018 | Zhang | G01C 21/206 |
| 2008/0059988 A1* | 3/2008 | Lee | G06Q 30/02 |
| | | | 725/9 |
| 2013/0261964 A1* | 10/2013 | Goldman | G01C 21/12 |
| | | | 701/500 |
| 2014/0372027 A1* | 12/2014 | Zhang | G01C 21/206 |
| | | | 701/500 |
| 2015/0177000 A1* | 6/2015 | Zhang | G01C 21/206 |
| | | | 701/494 |
| 2016/0139241 A1* | 5/2016 | Holz | H04B 17/318 |
| | | | 367/128 |
| 2017/0097239 A1* | 4/2017 | Zhang | G01C 21/206 |
| 2018/0328740 A1* | 11/2018 | Zhang | G01C 21/206 |
| 2018/0364050 A1* | 12/2018 | Zhang | G01C 21/206 |

* cited by examiner

POSITIONING METHOD USING BROADCAST SPEECHES

CROSS-REFERENCE TO RELATED APPLICATIONS

This is a continuation of an application "Music-Based Positioning Aided By Dead Reckoning", Ser. No. 15/382,735, filed Dec. 18, 2016, which is a continuation of an application "Music-Based Positioning Aided By Dead Reckoning", Ser. No. 14/637,380, filed Mar. 3, 2015, which is a continuation of an application "Music-Based Positioning Aided By Dead Reckoning", Ser. No. 14/088,437, filed Nov. 24, 2013, which claims benefits of a provisional application "Music-Based Positioning Aided By Dead Reckoning", Ser. No. 61/835,527, filed Jun. 14, 2013.

BACKGROUND

1. Technical Field of the Invention

The present invention relates to the field of mobile electronic system, and more particularly to indoor positioning using sounds of a music piece or a human speech.

2. Prior Arts

Sound has been suggested as a medium for positioning. For positioning in a large venue like a shopping mall or a supermarket, an important metric is the range of the sound. To limit the number of sound sources (e.g., loudspeakers), the sound used for positioning preferably has a long range.

Ultrasound, although widely used for ranging, fails in this aspect. Ultrasound suffers from severe attenuation when transmitted in air. For a distance of 100 meters, the transmission loss for a 40 kHz ultrasound is ~140 dB (FIG. 1). In fact, ultrasound can only be practically projected to a range of ~15 meters in air. As a result, ultrasound is not suitable for positioning in a large venue.

On the other hand, audible sounds attenuate much less in air. For example, the transmission loss for a 1 kHz audible sound is only ~40 dB for 100 meters (FIG. 1). To be projected to a long range, audible sounds are preferably the sounds of a music piece or a human speech, whose volume can be turned up without causing annoyance to persons in the immediately vicinity. Furthermore, large venues are generally equipped with public address (PA) systems, where loudspeakers are required to provide a good acoustic coverage. It would be very attractive to leverage the existing PA systems and use the sounds of a music piece or a human speech for positioning in a large venue. Hereinafter, music is used as a primary example for indoor positioning. This concept can be easily extended to human speech.

Although it has many advantages, music-based positioning (MP) faces a difficult challenge. A large venue is filled with background noises and multi-path reflections. Apparently, not every portion of a music piece can be used for positioning. For example, the portion of the music piece that is barely distinguishable from background noise cannot be used. To be suitable for positioning, a musical segment (i.e., a burst) should possess enough uniquely identifiable properties. A figure of merit is its correlativity, which represents the relative strength of its auto-correlation vs. its correlation with other signals. A burst with a large correlativity is relatively un-correlated with its lagged replica or background noise. In a music piece or a human speech, a burst suitable for positioning is referred to as its signature burst. The auto-correlation function of the signature burst will exhibit a distinct central peak with quickly diminishing side lobe tails.

Litwhiler et al. ("A simple method for evaluating audible signals for acoustic measurements", the Technology Interface, Vol. 7, No. 2, Spring 2007) taught a music-based positioning (MP) method. A music file is first sliced into bursts of 1 s long each. The correlativity of each burst is then calculated as the ratio between the peak value and the root-mean-square (rms) value of its auto-correlation function. A burst with correlativity higher than a pre-determined threshold (e.g., 20) is a signature burst, while the interval between two successive signature bursts is a non-signature interval. In the example illustrated in FIG. 2, there are 19 signature bursts (shown as cross-hatched bars) among 60 bursts evaluated. Its temporal coverage (i.e., the percentage of bursts that are suitable for positioning within a period) is ~30%. The longest non-signature interval is 10 s, which is substantially longer than any signature burst. During a non-signature interval, no positioning can be performed using the musical sounds. Because it only provides positioning service sporadically, music-based positioning (MP) was not suitable for indoor positioning.

OBJECTS AND ADVANTAGES

It is a principle object of the present invention to provide a continuous positioning service in a large venue using the existing infra-structure (e.g., loudspeakers in the public address system and microphones in mobile devices).

It is a further object of the present invention to improve the temporal coverage of music-based positioning (MP).

It is a further object of the present invention to improve the accuracy of dead reckoning (DR).

In accordance with these and other objects of the present invention, the present invention discloses music-based positioning aided by dead reckoning (MP-DR).

SUMMARY OF THE INVENTION

A music piece includes at least a melody and/or a rhythm. Being pleasant to hear, the music volume can be turned up to cover a larger area. However, because it only provides positioning service sporadically, music-based positioning (MP) was not suitable for indoor positioning. To provide continuous positioning service, the present invention discloses music-based positioning aided by dead reckoning (MP-DR). Generally, a music piece comprises at least first and second signature bursts separated by a non-signature interval. At each signature burst, musical sounds are used for positioning. During the non-signature interval, positioning is performed by dead reckoning. It should be apparent to those skilled in the art that this concept can be easily extended to human speech.

MP-DR is an ideal combination of music-based positioning (MP) and dead reckoning (DR), whose strengths and weaknesses exactly complement each other. MP provides accurate positioning with an error of ~1%. However, because most musical segments (i.e., non-signature bursts) are not suitable for positioning, MP can be performed only sporadically. The time gap between two successive MP measurements ranges from a few seconds to tens of seconds, during which a person can move a substantial distance. On the other hand, DR suffers from accumulation of errors. After calibrating its location at a reference point, although DR initially has a small error, this error grows rapidly and becomes unacceptable after a mobile user walks for more than one minute or so. For MP-DR, DR extends temporal coverage for MP, while MP provides the much needed periodic calibrations for DR.

BRIEF DESCRIPTION OF THE DRAWINGS

FIG. 5A illustrates the positioning of the mobile device using the DR-enhanced acoustic positioning method at $S_i$; FIG. 5B illustrates the progression of location errors between $S_i$ and $S_{i+1}$;

Figure 1:
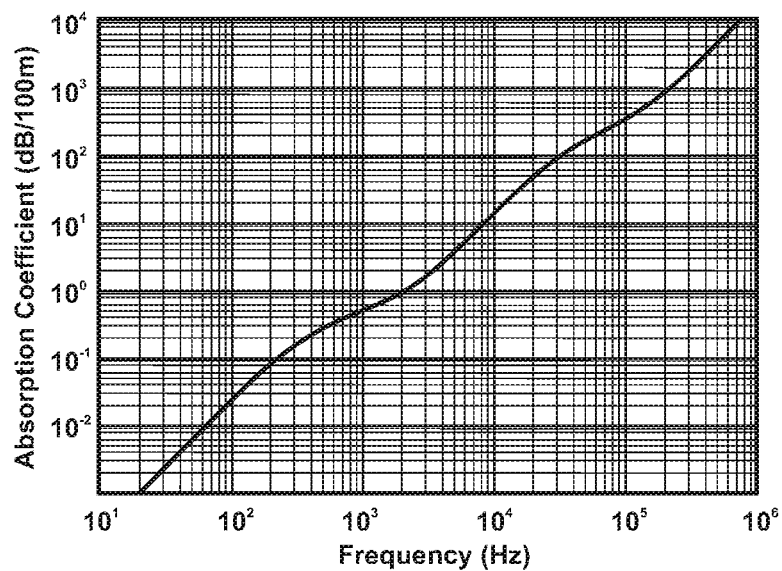
FIG. 1 displays the relationship of the sound absorption by air with the sound frequency.
Figure 2:
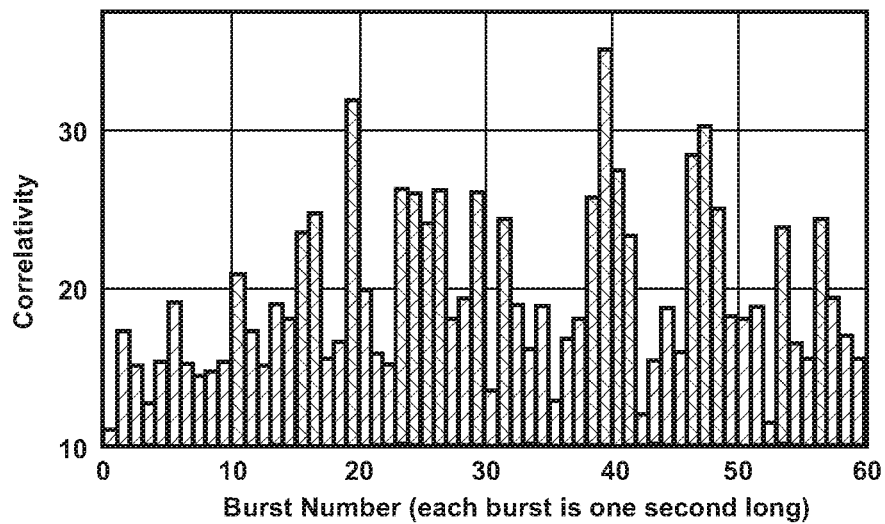
FIG. 2 displays the correlativity of the first 60 bursts (each burst is 1 s long) in "Margaritaville" by Jimmy Buffet (from Litwhiler)

It should be noted that all the drawings are schematic and not drawn to scale. Relative dimensions and proportions of parts of the device structures in the figures have been shown exaggerated or reduced in size for the sake of clarity and convenience in the drawings. The same reference symbols are generally used to refer to corresponding or similar features in the different embodiments.

DETAILED DESCRIPTION OF THE PREFERRED EMBODIMENTS

Those of ordinary skills in the art will realize that the following description of the present invention is illustrative only and is not intended to be in any way limiting. Other embodiments of the invention will readily suggest themselves to such skilled persons from an examination of the within disclosure.

As used herein, a "location" refers to a geographic area with a lower resolution. Because it has a low accuracy, a geographic area identified by dead reckoning (DR) is generally referred to as a location. Accordingly, the process of identifying a geographic area by DR is referred to as localization. A "position" refers to a geographic area with a higher resolution. Because it has a high accuracy, a geographic area identified by acoustic positioning (AP) or music-based positioning (MP) is generally referred to as a position. Accordingly, the process of identifying a geographic area by AP or MP is referred to as positioning.

A music piece includes at least a melody and/or a rhythm. Being pleasant to hear, the music volume can be turned up to cover a larger area. As music is used as a primary example for positioning, the terms "music-based positioning (MP)" and "acoustic positioning (AP)" are used interchangeably. They both refer to a positioning method using sounds of a music piece.

Referring now to FIGS. 3-5B, a general description for music-based positioning aided by dead reckoning (MP-DR) is provided. Generally, a music piece (or, a human speech) comprises at least first and second signature bursts (i.e., a highly unique short musical segment suitable for positioning) separated by a non-signature interval. At each signature burst, musical sounds are used for positioning. During a non-signature interval, positioning is performed by dead reckoning. More details of MP-DR are disclosed below.

Figure 3:
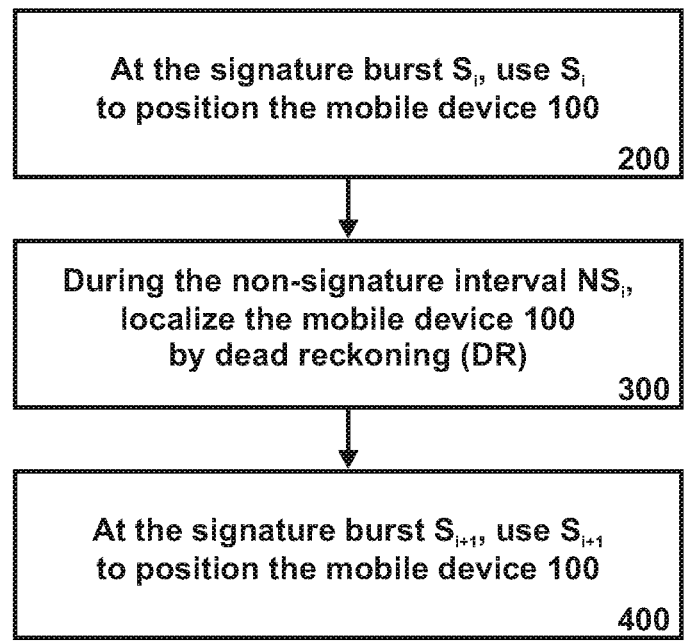
FIG. 3 is a flow chart of a preferred MP-DR method.
Figure 5A:
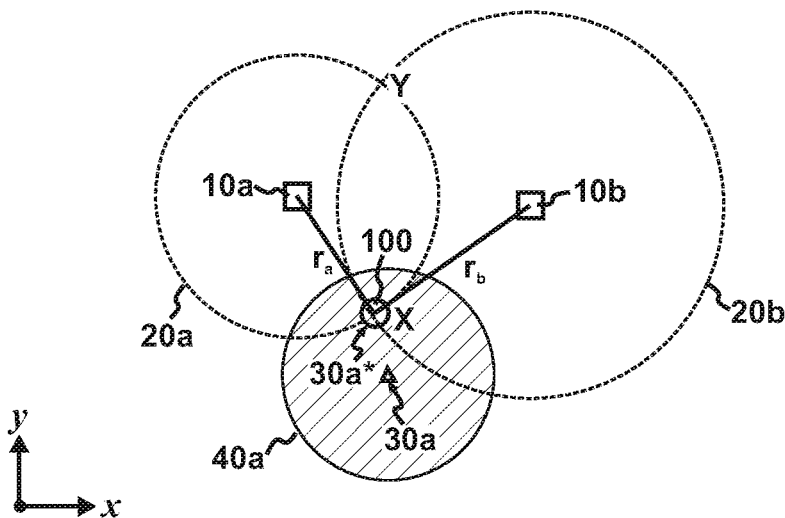
FIGS. 5A-5B illustrate a way to perform MP-DR between the signature bursts $S_i$ and $S_{i+1}$.

At a first signature burst $S_i$, a mobile device 100 is positioned using the signature burst $S_i$ (step 200 of FIG. 3). This is performed using a DR-enhanced acoustic positioning method. It includes the following steps. At the starting point $TS_i$ of the signature burst $S_i$, at least two sound-transmitting devices (e.g., speakers) 10a, 10b simultaneously produce a signature burst $S_i$ (FIG. 5A). The time-of-flight (TOF) between the mobile device 100 and each speaker is measured and converted to distances $r_a$, $r_b$ by multiplying the speed of sound. The intersections X, Y of circles 20a (with its center at 10a and a radius of $r_a$) and 20b (with its center at 10b and a radius of $r_b$) are two possible positions of the mobile device 100. This positioning is further narrowed down to 30a* (i.e., intersection X) by selecting the intersection (X or Y) which is located within the possible DR locations 40a. Here, possible DR locations 40a include all locations predicted by dead reckoning. In this example, it is represented by a circle whose center 30a is the estimated DR location and whose radius is the DR error. Besides TOF, time-difference-of-flight (TDOF) may also be used for positioning.

Although dead reckoning could have a large error (meters to tens of meters), this error is not passed on to the position 30a* because dead reckoning is only used to select one out of two intersections X, Y. The accuracy of the position 30a* is primarily determined by the accuracy of the radii $r_a$, $r_b$. Because acoustic ranging has a high accuracy (~1%), the position 30a* can achieve a high accuracy, typically around tens of centimeters (FIG. 4).

Figure 4:
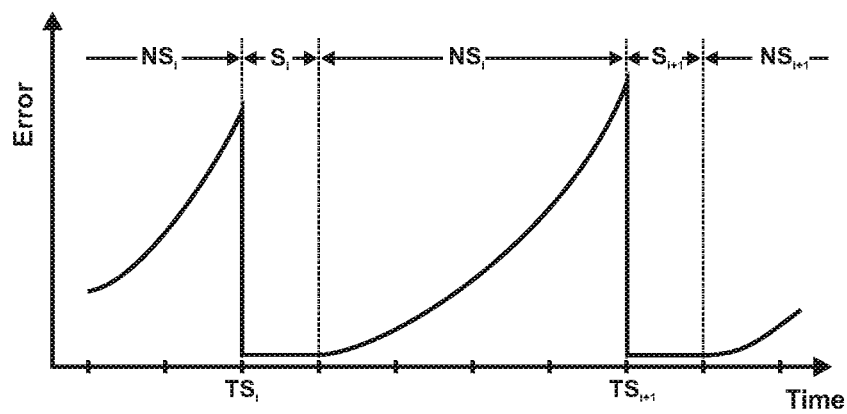
FIG. 4 displays error vs. time for the MP-DR.

During a non-signature interval $NS_i$ (e.g., including all non-signature bursts between two successive signature bursts $S_i$ and $S_{i+1}$ of FIG. 4), the mobile device 100 is localized by dead reckoning (step 300 of FIG. 3). Dead reckoning (DR) is a process of calculating one's current location by using a previously determined location, and advancing that location based upon known or estimated speeds over elapsed time. Dead reckoning uses the accelerometer and the compass of the mobile device to track the mobile user. Based on the accelerometer reading, it is possible to tell whether the user has taken a step, and therefrom estimate the displacement. Based on the compass reading, the direction of each step can be tracked.

Because of the noisy sensors, dead reckoning suffers from accumulation of errors, which can grow cubically with the total number of steps walked from the last reference point, where its location is calibrated. This is further illustrated in FIG. 5B. At position 30a*, the location of the mobile device 100 is calibrated by acoustic positioning and has a small error. As the mobile user walks along the path 50, each step (e.g., 30b, 30c, 30d) increases the location error, as indicated by the increased size of these circles.

Figure 5B:
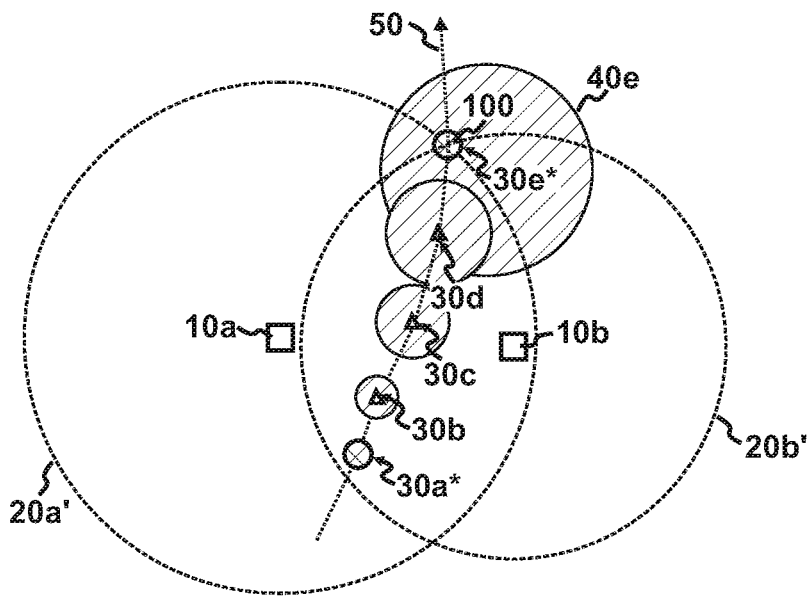

At a second signature burst $S_{i+1}$, the mobile device 100 is again positioned using the signature burst $S_{i+1}$ (step 400 of FIG. 3). Similar to FIG. 5A, the mobile device 100 has two possible positions, i.e., two intersections of circles 20a', 20b' (FIG. 5B). Because possible DR locations 40e have already been predicted from dead reckoning, the mobile device 100 can be easily positioned. Overall, the location error of the mobile device 100 exhibits a saw-tooth behavior: at the first signature burst $S_i$, the error is small; during the non-signature interval $NS_i$, the error grows and then sharply drops at the next signature burst $S_{i+1}$ (FIG. 4).

Figure 6:
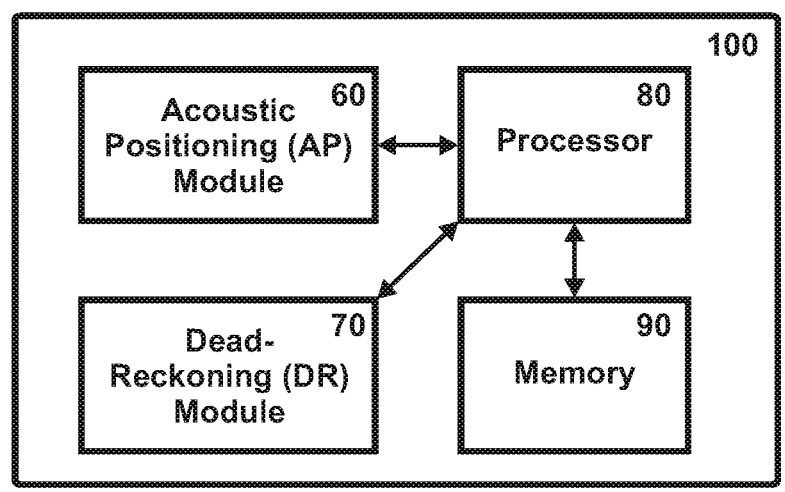
FIG. 6 is a functional block diagram of a mobile device in a preferred MP-DR system.

Referring now to FIG. 6, a mobile device 100 used in a preferred MP-DR system is illustrated. The mobile device 100 can be a variety of different types of devices, with different devices being the same or different types of devices. For example, device can be a cellular or other wireless phone, a laptop or netbook computer, a tablet or notepad computer, a mobile station, an entertainment appliance, a game console, an automotive computer, and so forth. Thus, device may range from a full resource device with substantial memory and processor resources (e.g., personal computers, game consoles) to a low-resource device with limited memory and/or processing resources (e.g., traditional set-top boxes, hand-held game consoles).

The mobile device 100 comprises an acoustic positioning (AP) module 60, a dead-reckoning (DR) module 70, a processor 80 and a memory 90. In some embodiments, the mobile device 100 may include many more components than those shown in FIG. 6. However, it is not necessary that all of these generally conventional components be shown in order to disclose an illustrative embodiment.

The AP module 60 is primarily a music-based positioning (MP) module. It measures the device position using sounds of a music piece or a human speech. The measurement principles range from signal strength measurement to time-of-flight (TOF) measurement. The TOF measurement further includes pulsed time measurement, continuous-wave measurement (e.g., pattern-matching or phase-shift measurement) and others. More details of the AP module 60 are disclosed in FIGS. 7-8C.

The DR module 70 receives sensor data and executes DR algorithm to determine the location of the mobile device based on vector analysis of changes in the sensor data. It comprises a plurality of inertial sensors that detect movement (e.g., rotation, motion, velocity, etc.), altitude, and/or direction. These inertial sensors can include an accelerometer, a compass, a gyroscope, and so forth. They collect data regarding the detected movement, position, and/or direction of the device.

The processor 80 accepts digital data as input, processes it according to instructions stored in the memory 90 and provides results as output. The memory 90 is adapted to store software. According to the teachings of the present invention, software is provided which includes a set of executable instructions, programs, and or program modules adapted to control the AP module 60 and the DR module 70. In some preferred embodiments, the memory 90 also stores the content data of the music sounds and/or the human speech. It can also store the signature-burst meta-data associated with the music sounds (or, the human speech).

Figure 7:
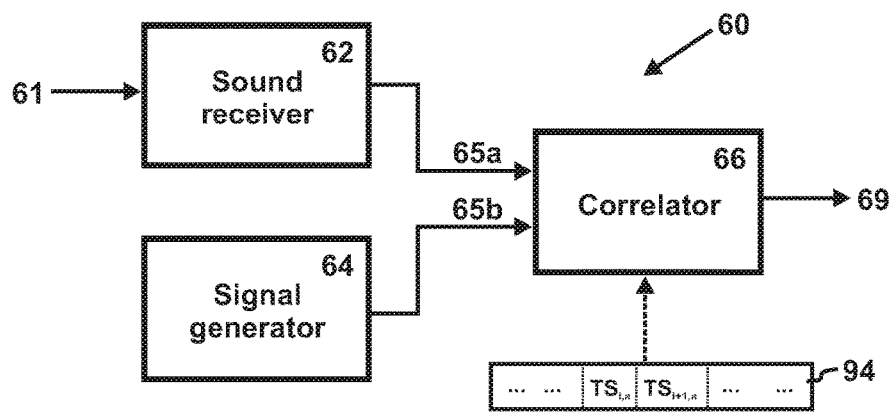
FIG. 7 is a functional block diagram of a preferred acoustic positioning (AP) module.

Referring now to FIG. 7, a functional block diagram of a preferred MP module 60 is disclosed. The preferred MP module 60 comprises a sound receiver 62, a signal generator 64 and a correlator 66. The sound receiver 62 is generally a microphone. It receives the acoustic signals 61 (e.g. music or speech signals) from the speakers and converts them into electrical signals, i.e., the received music (or speech) signals. The received music (or speech) signals generally lag behind the transmitted music (or speech) signals. The signal generator 64 produces a replica of the transmitted music (or speech) signals. The correlator 66 has two inputs 65a and 65b: the first input 65a includes the received music (or speech) signals, while the second input includes the replica of the transmitted music (or speech) signals. In order to provide real-time music (or speech)-based positioning, a signature-burst meta-data 94 is transmitted to the mobile device 100 and stored in its memory 90. This signature-burst meta-data 94 includes the timing information ($TS_i$, $TS_{i+1}$ ...) of all signature bursts ($S_i$, $S_{i+1}$ ...) of the audio contents (including music or speech) to be played. At the expected occurrence of a signature burst (e.g., $S_i$), the correlator 66 is turned on. By matching the pattern of the transmitted signals to the received signals, the delay of the received signals with respect to the transmitted signals can be measured. This delay is the time-of-flight (TOF) between the speaker and the microphone.

Figure 8A:
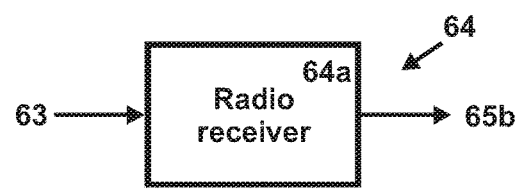
FIGS. 8A-8C illustrate three preferred signal generators.
Figure 8B:
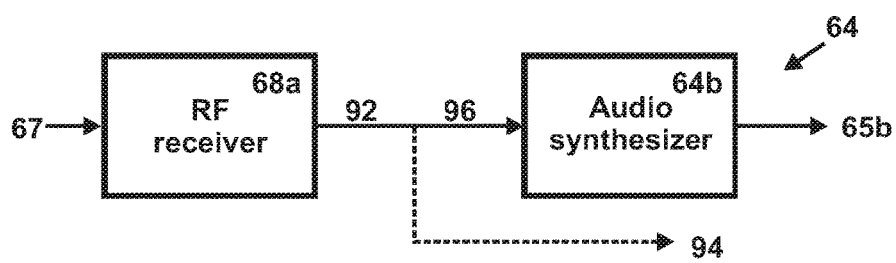
Figure 8C:
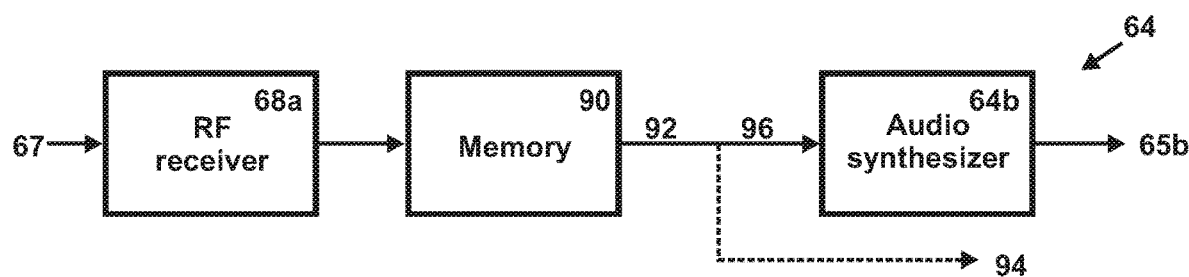

Referring now to FIGS. 8A-8C, several preferred signal generators 64 are disclosed. In FIG. 8A, all remote speakers simultaneously driven by an audio player and produce sounds from radio broadcast (e.g., AM/FM) signals. The preferred signal generator 64 is a radio receiver 64a. It receives the same radio broadcast signals as the audio player. Through mixing, filtering and amplifying, it converts the radio signals into base-band signals 65b. Because the radio signals have a much faster speed (i.e., the speed of light) than the acoustic signals (i.e., the speed of sound), the base-band signals 65b is considered as a replica of the transmitted signals. In this preferred embodiment, the signature-burst meta-data 94 is preferably transmitted by radio broadcast signals, too.

In FIG. 8B, all remote speakers are simultaneously driven by an audio player. The audio player plays a list of audio contents pre-defined by an operator. The signal generator 64 comprises an RF receiver 68a and an audio synthesizer 64b. At a pre-determined location (e.g., at the entrance) of the venue, the play-list (including the playback schedule) and the associated digital audio files 92 are downloaded to the mobile device via RF signals 67 (e.g., via WiFi and/or cellular signals) through the RF receiver 68a. This does not require full WiFi coverage at the venue. The digital audio files 92 further include the signature-burst meta-data 94 and the content data 96. The audio synthesizer 64b converts the content data 96 into a replica of the transmitted signals 65b.

FIG. 8C is similar to FIG. 8B, except that the memory 90 of the mobile device 100 already stores the digital audio (including music and speech) files on the play-list. In this case, only the play-list (including playback schedule) are downloaded to the mobile device 100 via the RF signals 67. This requires less download time and incurs less download cost.

Compared with music pieces, human speeches generally comprise more signature bursts and are more suitable for positioning. Accordingly, the present invention discloses a method for continuously determining a geographic area of an apparatus using sounds of a broadcast speech including first and second signature bursts separated a first non-signature interval and followed by a second non-signature interval, comprising the steps of: A) determining a first position of said apparatus by an acoustic-positioning (AP) module at said first signature burst by correlating received audio signals and transmitted audio signals; B) determining locations of said apparatus by using said first position as a first initial location for dead reckoning by a dead-reckoning (DR) module during said first non-signature interval; C) determining a second position of said apparatus by said AP module at said second signature burst by correlating received audio signals and transmitted audio signals; D) determining locations of said apparatus by using said second position as a second initial location for dead reckoning by said DR module during said second non-signature interval.

While illustrative embodiments have been shown and described, it would be apparent to those skilled in the art that many more modifications than that have been mentioned above are possible without departing from the inventive concepts set forth therein. Although music is used as a primary example to illustrate AP-MD, this concept can be easily extended to human speech. The invention, therefore, is not to be limited except in the spirit of the appended claims.

What is claimed is:

1. An indoor-positioning method for continuously determining an indoor geographic area of an apparatus using sounds of a broadcast speech including first and second signature bursts separated by a first non-signature interval and followed by a second non-signature interval, comprising the steps of:
   A) determining a first position of said apparatus by an acoustic-positioning (AP) module at said first signature burst by correlating received audio signals and transmitted audio signals;
   B) determining locations of said apparatus by using said first position as a first initial location for dead reckoning by a dead-reckoning (DR) module during said first non-signature interval;
   C) determining a second position of said apparatus by said AP module at said second signature burst by correlating received audio signals and transmitted audio signals;
   D) determining locations of said apparatus by using said second position as a second initial location for dead reckoning by said DR module during said second non-signature interval,
   whereby said broadcast speech is produced by a public address (PA) system.

2. The method according to claim 1, wherein said first or second signature burst has a correlativity higher than a pre-determined value.

3. The method according to claim 2, wherein the correlativity of a signature burst is the ratio of the peak value and the root-mean-square (rms) value of the auto-correlation function of said signature burst.

4. The method according to claim 1, further comprising a memory for storing a signature-burst meta-data associated with said broadcast speech.

5. The method according to claim 1, further comprising a memory for storing content data for said broadcast speech.

6. The method according to claim 1, wherein said AP module further comprises a signal generator for generating a replica of said transmitted audio signals.

7. The method according to claim 1, wherein said AP module measures the time-of-flight of said received audio signals with respect to said transmitted audio signals.

8. The method according to claim 1, wherein said sounds of said broadcast speech are simultaneously generated by at least two sound-transmitting devices.

9. The method according to claim 8, wherein said AP module measures the time-difference-of-flight of said received audio signals.

10. The method according to claim 1, wherein said DR module comprises at least an accelerometer, a compass and/or a gyroscope.

* * * * *